(12) United States Patent
Juh

(10) Patent No.: US 11,053,798 B2
(45) Date of Patent: Jul. 6, 2021

(54) GAS TURBINE ENGINE HAVING A TRIM BALANCE

(71) Applicant: United Technologies Corporation, Farmington, CT (US)

(72) Inventor: Christopher M. Juh, Hobe Sound, FL (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 333 days.

(21) Appl. No.: 16/183,008

(22) Filed: Nov. 7, 2018

(65) Prior Publication Data

US 2020/0141240 A1    May 7, 2020

(51) Int. Cl.
| F01D 25/04 | (2006.01) |
| F01D 5/02 | (2006.01) |
| F04D 29/66 | (2006.01) |
| F16F 15/32 | (2006.01) |

(52) U.S. Cl.
CPC ............ *F01D 5/027* (2013.01); *F01D 25/04* (2013.01); *F04D 29/662* (2013.01); *F16F 15/322* (2013.01); *F05D 2230/30* (2013.01)

(58) Field of Classification Search
CPC .......... F01D 5/027; F01D 25/04; F01D 25/06; F04D 29/662; F16F 15/322; F16F 15/32; F05D 2230/30; G01M 1/36
See application file for complete search history.

(56) References Cited

U.S. PATENT DOCUMENTS

| 4,059,972 A | 11/1977 | Beam, Jr. et al. |
| 5,676,025 A * | 10/1997 | Lulay ................ F16F 15/36 451/343 |
| 9,556,929 B2 | 1/2017 | Hopkins |
| 9,989,120 B2 * | 6/2018 | Yamamoto ............. F16F 15/36 |
| 2005/0249596 A1 * | 11/2005 | Hsieh .................... F04D 29/662 416/144 |
| 2007/0253820 A1 * | 11/2007 | Liu ....................... F04D 29/662 416/144 |
| 2011/0078901 A1 * | 4/2011 | Glasspoole ............. F01D 5/027 29/889 |
| 2012/0121410 A1 * | 5/2012 | Liu ....................... F04D 29/326 415/220 |
| 2015/0345294 A1 * | 12/2015 | Wang ..................... F01D 5/027 73/468 |
| 2016/0102680 A1 * | 4/2016 | Huang ................ F04D 25/0613 416/144 |
| 2017/0211591 A1 * | 7/2017 | Horng .................. F04D 29/662 |

FOREIGN PATENT DOCUMENTS

| EP | 2447472 A2 | 5/2012 |
| FR | 3001515 A1 | 8/2014 |

OTHER PUBLICATIONS

European Search Report for European Application No. 19195570.7, dated Mar. 27, 2020, 6 pages.

* cited by examiner

*Primary Examiner* — Aaron R Eastman
(74) *Attorney, Agent, or Firm* — Cantor Colburn LLP

(57) ABSTRACT

A trim balance device for a gas turbine engine having a rotatable shaft extending along a central longitudinal axis of the gas turbine engine includes a trim balance nut that is at least partially disposed about the rotatable shaft. The trim balance nut defines an aperture that extends from a first trim balance nut end towards a second trim balance nut end along the central longitudinal axis. The aperture being arranged to receive and seat a balance weight.

15 Claims, 3 Drawing Sheets

GAS TURBINE ENGINE HAVING A TRIM BALANCE

STATEMENT OF FEDERAL SUPPORT

This invention was made with Government support under W911W6-16-2-0012 awarded by the United States Department of the Army. The Government has certain rights in the invention.

BACKGROUND

Exemplary embodiments of the present disclosure pertain to the art of trim balance devices for gas turbine engines.

Shafts or other rotatable components of gas turbine engines may experience dynamic imbalance that may lead to vibrations or harmonics. Traditionally individual rotating components may be balanced and then assembled together. The assembled rotating components may also experience dynamic imbalance that may be experienced at the system level.

BRIEF DESCRIPTION

Disclosed is a trim balance device for a gas turbine engine having a rotatable shaft extending along a central longitudinal axis of the gas turbine engine. The trim balance devices includes a trim balance nut that is at least partially disposed about the rotatable shaft. The trim balance nut defines an aperture that extends from a first trim balance nut end towards a second trim balance nut end along the central longitudinal axis. The aperture being arranged to receive and seat a balance weight.

In addition to one or more of the features described above, or as an alternative to any of the foregoing embodiments, a stack nut disposed about the rotatable shaft, the stack nut being arranged to retain the balance weight within the aperture.

In addition to one or more of the features described above, or as an alternative to any of the foregoing embodiments, the trim balance nut includes an outer surface and an inner surface that each extend between the first trim balance nut end and the second trim balance nut end.

In addition to one or more of the features described above, or as an alternative to any of the foregoing embodiments, the trim balance nut defines a groove that radially extends from the aperture towards the outer surface and the inner surface.

In addition to one or more of the features described above, or as an alternative to any of the foregoing embodiments, a retaining ring that is received within the groove and is arranged to retain the balance weight within the aperture.

Also disclosed is a gas turbine engine having a central longitudinal axis. The gas turbine engine includes a turbine section having a turbine disposed about a rotatable shaft that extends along the central longitudinal axis; and a trim balance device disposed about the rotatable shaft. The trim balance device includes a trim balance nut having an outer surface and an inner surface that engages the rotatable shaft. The outer surface and the inner surface each extend between a first trim balance nut end and a second trim balance nut end along the central longitudinal axis. The trim balance nut defining an aperture that extends from the first trim balance nut end towards the second trim balance nut end along the central longitudinal axis. The aperture being arranged to receive and seat a balance weight.

In addition to one or more of the features described above, or as an alternative to any of the foregoing embodiments, the trim balance nut having a retention assembly that extends from the second trim balance nut end towards a second rotatable shaft that is connected to the rotatable shaft.

In addition to one or more of the features described above, or as an alternative to any of the foregoing embodiments, the retention assembly having a first arm that extends from the second trim balance nut end along the central longitudinal axis.

In addition to one or more of the features described above, or as an alternative to any of the foregoing embodiments, the retention assembly having a second arm that extends from the first arm and extends into a pocket that is defined by the second rotatable shaft to facilitate retaining the trim balance nut to the second rotatable shaft; and a third arm that extends from at least one of the first arm and the second arm, the third arm being spaced apart from the second rotatable shaft.

In addition to one or more of the features described above, or as an alternative to any of the foregoing embodiments, the third arm defining a recess.

In addition to one or more of the features described above, or as an alternative to any of the foregoing embodiments, a locking assembly that extends between the recess and a slot of the second rotatable shaft.

In addition to one or more of the features described above, or as an alternative to any of the foregoing embodiments, a stack nut disposed about the rotatable shaft.

In addition to one or more of the features described above, or as an alternative to any of the foregoing embodiments, wherein the stack nut is arranged to retain the balance weight within the aperture.

Further disclosed is a method of balance correction of a rotatable shaft of a gas turbine engine. The method comprising the steps of: installing a trim balance nut to the rotatable shaft, the trim balance nut defining a plurality of circumferentially spaced apart apertures that extend from a first trim balance nut end towards a second trim balance nut end along a central longitudinal axis; identifying a level of balance correction of at least the rotatable shaft; identifying an aperture of the plurality of circumferentially spaced apart apertures associated with the level of balance correction; and removing the trim balance nut from the rotatable shaft.

In addition to one or more of the features described above, or as an alternative to any of the foregoing embodiments, inserting a balance weight into the identified aperture.

In addition to one or more of the features described above, or as an alternative to any of the foregoing embodiments, installing the trim balance nut having the balance weight installed into the identified aperture onto the rotatable shaft.

In addition to one or more of the features described above, or as an alternative to any of the foregoing embodiments, retaining the balance weight within the identified aperture with a finger of a stack nut that is disposed about the rotatable shaft and is spaced apart from the trim balance nut.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
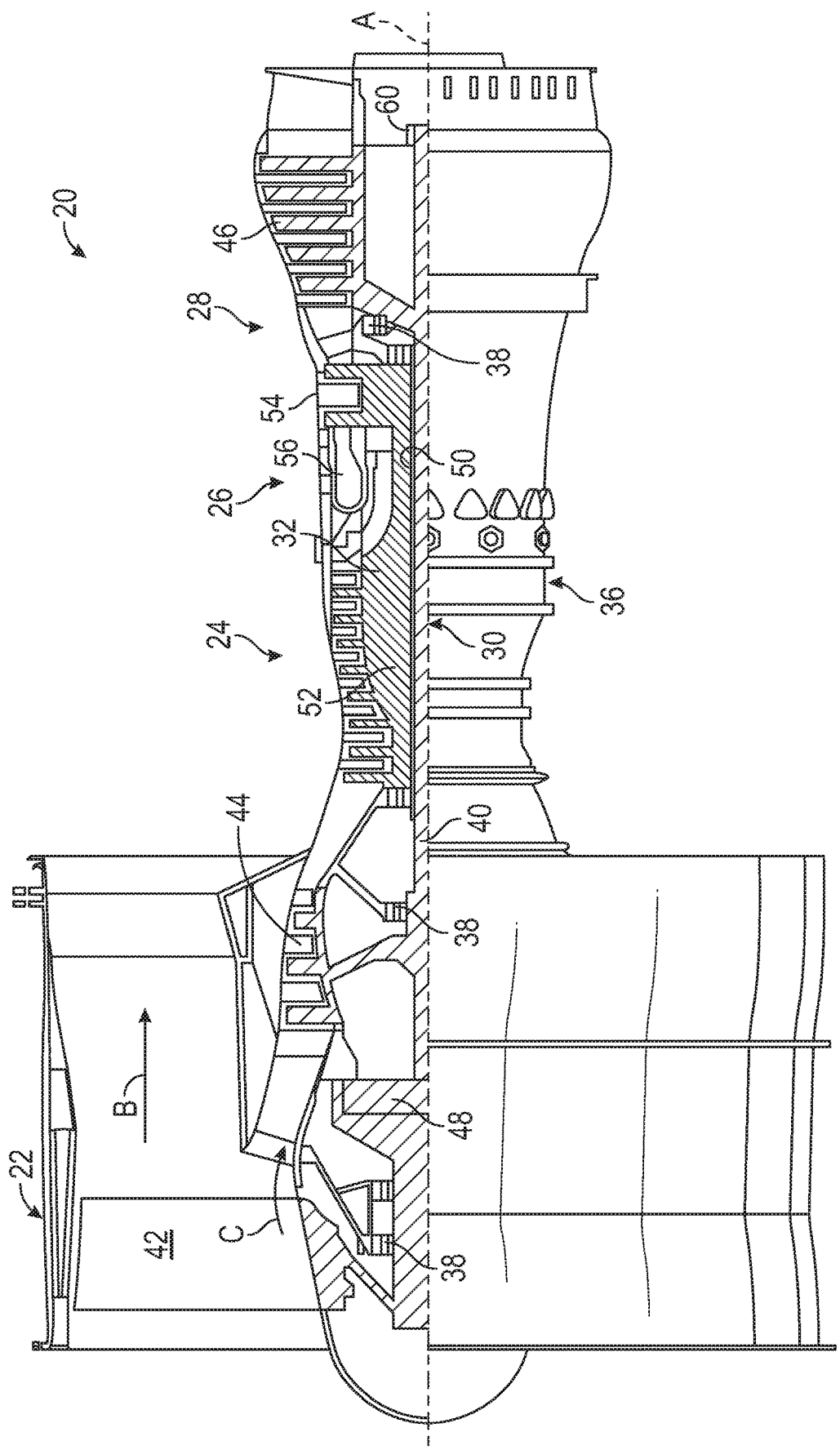
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30.

The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. The gear system 48 may also not be provided should the gas turbine engine 20 not be a geared turbofan engine.

The engine 20, in one example, is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

The inner shaft 40, the outer shaft 50, or various rotors or discs of the gas turbine engine 20 may undergo individual balancing procedures prior to assembly into or with the gas turbine engine 20. After assembly of the inner shaft 40, outer shaft 50, or various rotors or discs with the gas turbine engine 20 an imbalance may be present or detected. A trim balance device 60 may be provided that attaches to a rotatable shaft or rotatable spool, e.g. the inner shaft 40 or the outer shaft 50, of the gas turbine engine 20 having provisions to allow for correction or balancing of the rotatable shaft while the gas turbine engine 20 is in a substantially assembled state. The trim balance device 60 enables a rotatable shaft or rotors of the gas turbine engine 20 to be balanced during the operational life of the engine without the removal of material from the rotatable shaft or rotors.

A trim balance device 60 is at least partially disposed about and is attached to or connected to the inner shaft 40 and/or the outer shaft of the gas turbine engine 20. The trim balance device 60 is arranged to correct unbalance or provide a magnitude of balance correction to at least a rotatable shaft (the inner shaft 40 and/or the outer shaft 50) or rotor/disc. The trim balance device 60 may be disposed about the inner shaft 40 and/or the outer shaft 50 and may be disposed aft/downstream of at least one of the high pressure turbine 54 and low pressure turbine 46 or disposed concentrically with the low pressure turbine 46 of the turbine section 28. In the embodiment shown, the trim balance device 60 is shown attached to the inner shaft 40 that extends through the turbine section 28.

Figure 2:
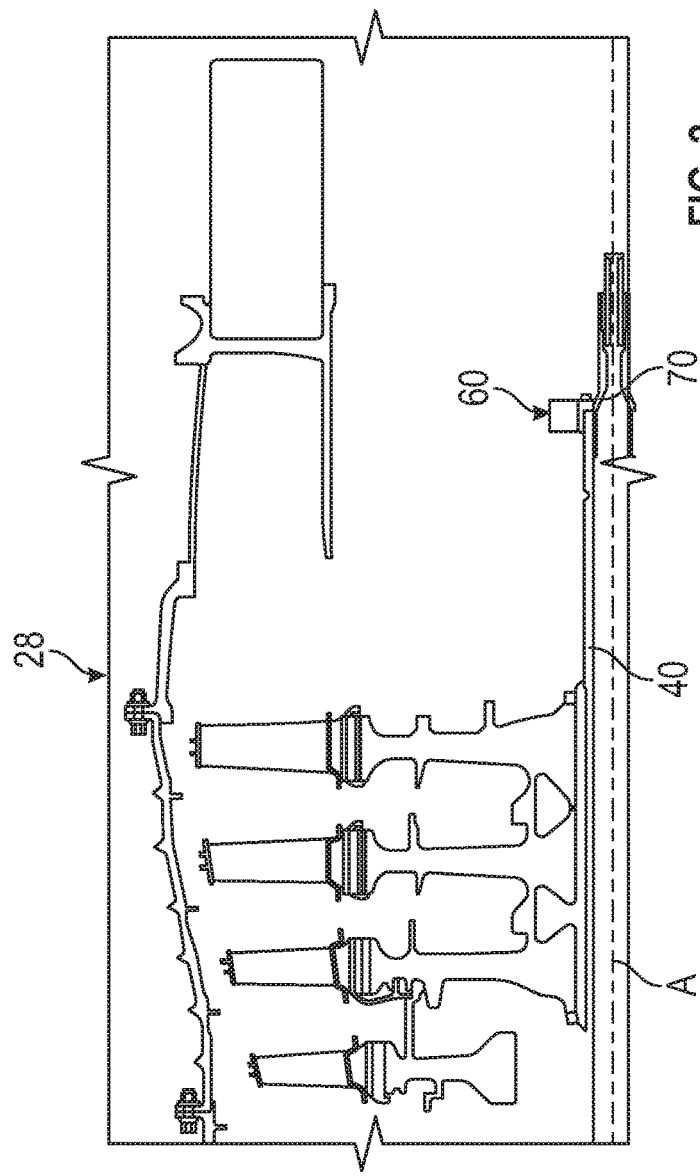
FIG. 2 is a partial cross-sectional view of a portion of the gas turbine engine.
Figure 3:
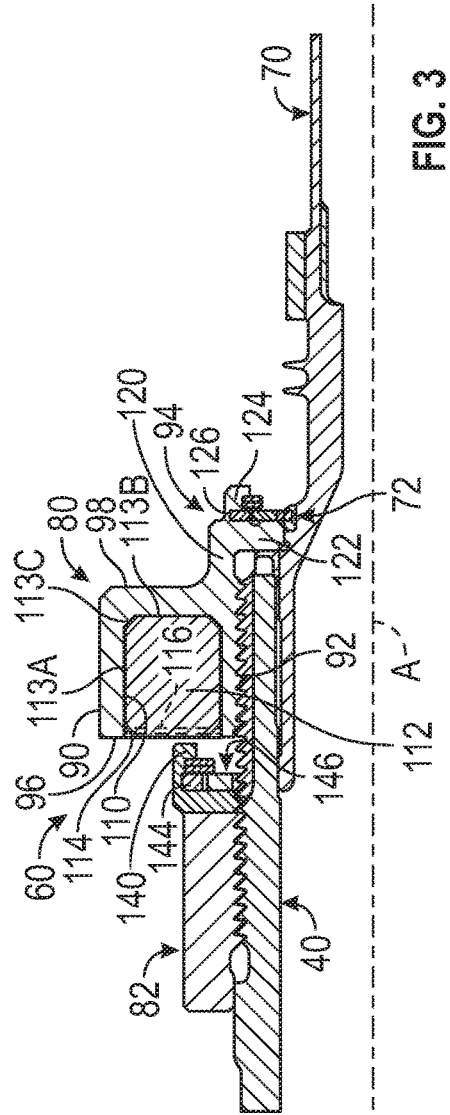
FIG. 3 is a partial section view of a trim balance device coupled to a shaft of the gas turbine engine.

Referring to FIGS. 2 and 3, a second rotatable shaft 70 is connected to the rotatable shaft (e.g. the inner shaft 40 and/or the outer shaft 50). The second rotatable shaft 70 may extend at least partially into the rotatable shaft and extends from the rotatable shaft along the central longitudinal axis A. The second rotatable shaft 70 may be a shaft adapted to connect to instrumentation or other devices.

The trim balance device 60 may be connected to both the rotatable shaft and the second rotatable shaft 70 and may be arranged to correct for imbalance of at least one of the rotatable shaft and the second rotatable shaft 70. The second rotatable shaft 70 defines a notch or a pocket 72 that extends from a surface of the second rotatable shaft 70 towards the central longitudinal axis A, as shown in FIG. 3.

Figure 4:
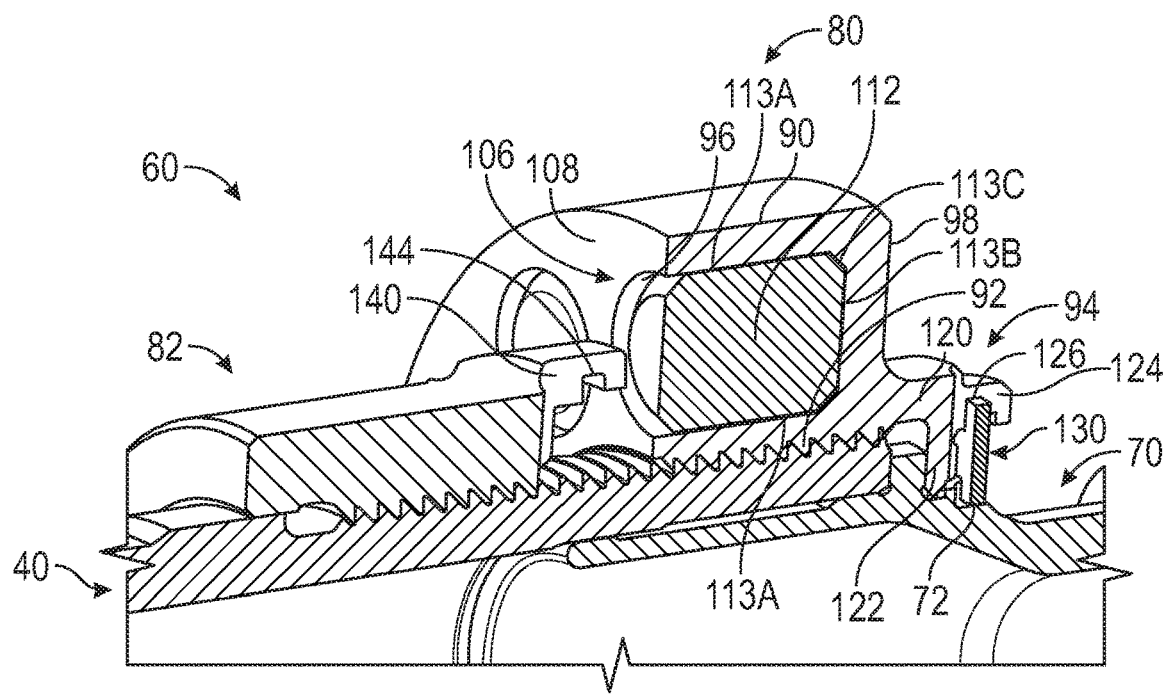
FIG. 4 is another partial section view of the trim balance device coupled to the shaft of the gas turbine engine.
Figure 5:
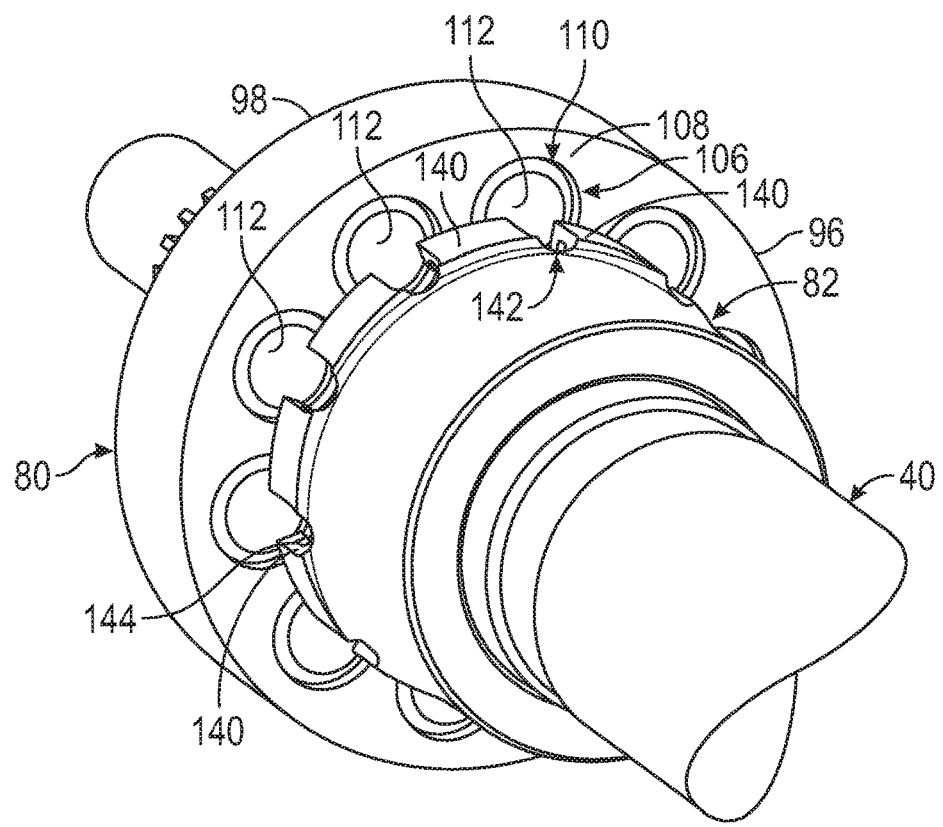
FIG. 5 is yet another partial section view of the trim balance device coupled to the shaft of the gas turbine engine.

Referring to FIGS. 3-5, the trim balance device 60 includes a trim balance nut 80 and a stack nut 82.

The trim balance nut 80 is installed on and is at least partially disposed about the rotatable shaft. The trim balance nut 80 includes an outer surface 90, an inner surface 92, and a retention assembly 94. The outer surface 90 is disposed opposite the inner surface 92 that engages the rotatable shaft. The inner surface 92 may be provided with threads or other engagement features that engage engagement features that are defined by the rotatable shaft. The outer surface 90 and inner surface 92 each extend between a first trim balance nut end 96 and a second trim balance nut end 98 along the central longitudinal axis A.

The trim balance nut 80 defines a plurality of apertures 106, as shown in FIGS. 4 and 5. Each aperture 110 of the plurality of apertures 106 extends from the first trim balance nut end 96 towards the second trim balance nut end 98 such that the first trim balance nut end 96 is arranged as an open end and the second trim balance nut end 98 is arranged as a closed end. Each aperture 110 of the plurality of apertures 106 is arranged to receive and seat a balance weight 112.

Each aperture 110 of the plurality of apertures 106 may include a chamfer 113C defined between a side surface 113A of a pair of side surfaces and an end surface 113B, as shown in FIGS. 3 and 4. The chamfer 113 C is arranged to facilitate the seating of the balance weight 112 in the aperture 110.

A balance weight 112 may be disposed in an aperture 110 of the plurality of apertures 106 based on a determination of an unbalance of at least the rotatable shaft and an identification of a level of balance correction. The identification of the level of balance correction may also identify an aperture 110 of the plurality of apertures 106 that should receive the balance weight 112 to at least partially correct the imbalance or level of balance. The identification of the aperture 110 may correspond to an identification of a radial and/or circumferential location on a face 108 of the trim balance nut 80 that is disposed at the first trim balance nut end 96 that is located proximate an aperture 110. In order to install a balance weight 112 into an aperture 110 of the plurality of apertures 106, the trim balance nut 80 may be removed from the rotatable shaft and the balance weight 112 may be inserted into the identified aperture 110 of the trim balance nut 80. The trim balance nut 80 having at least one balance weight 112 installed/inserted into an identified aperture 110 is then reinstalled onto the rotatable shaft.

The plurality of apertures 106 allows for various combinations of balance weights 112 to be disposed within various apertures or the same aperture about the trim balance nut 80 to fine tune the magnitude and/or angle of balance. For example, a pair of balance weight may be disposed within an aperture at a first radial/circumferential location of the trim balance nut 80 without other balance weights being disposed in other apertures or a pair of balance weights may be disposed within an aperture at a first radial/circumferential location and another grouping of balance weights or a single balance weight may be disposed in another aperture at a second radial/circumferential location to obtain a different magnitude and/or angle of balance.

The magnitude of balance correction may be refined using balance weights 112 having different material weights or various shapes (e.g. the center of the balance weight 112 may define an opening that extends completely through the balance weight by drilling or otherwise removing material or the outer diameter surface may define various cut outs or surface features providing a different magnitude of balance. The angle of balance correction may be refined by using balance weights 112 of different material weights or shapes as described above or the trim balance nut 80 itself may be positioned axially along the inner shaft 40 relative to the central longitudinal axis A to provide the desired balance correction. In such an arrangement, the trim balance nut 80 may be rotated circumferentially about the inner shaft 40 relative to the central longitudinal axis A to precisely position the trim balance nut 80 relative to the maximum unbalance at the axial location selected.

The trim balance nut 80 may define a groove 114 that radially extends, relative to the central longitudinal axis A, from the aperture 110 towards at least one of the outer surface 90 and/or the inner surface 92. The groove 114 may axially extend, relative to the central longitudinal axis A, from the first trim balance nut end 96 towards the second trim balance nut end 98. The groove 114 may be a threaded groove or a non-threaded groove. The groove 114 is disposed proximate the first trim balance nut end 96. A retaining ring 116 may be received within the groove 114 and is arranged to axially retain the balance weight 112 within the aperture 110, as shown in FIG. 3.

The retention assembly 94 extends from the second trim balance nut end 98 and is arranged to retain the trim balance nut 80 to at least one of the rotatable shaft and the second rotatable shaft 70. The retention assembly 94 may include a first arm 120, a second arm 122, and a third arm 124. The first arm 120 extends from the second trim balance nut end 98 along the central longitudinal axis A. The second arm 122 extends from the first arm 120 and is disposed generally perpendicular to the first arm 120. The second arm 122 at least partially extends into the pocket 72 of the second rotatable shaft 70. The receiving of the second arm 122 in the pocket 72 assists in retaining the trim balance nut 80 to at least the second rotatable shaft 70. The third arm 124 extends from at least one of the first arm 120 and the second arm 122. The third arm 124 is spaced apart from the second rotatable shaft 70. The third arm 124 defines a recess 126.

A locking assembly 130 extends between the recess 126 of the third arm 124 and the pocket 72 of the second rotatable shaft 70. The locking assembly 130 is arranged to inhibit the trim balance nut 80 from loosening from at least one of the rotatable shaft and the second rotatable shaft 70. The locking assembly 130 may be a Vernier ring having tabs that lock into the recess 126 and a slot or the pocket 72 of the second rotatable shaft 70. The Vernier ring is arranged such that the ring may fit at any circumferential location of the trim balance nut 80 such that the trim balance nut 80 may be locked at the circumferential location.

The stack nut 82 is disposed about the rotatable shaft and is spaced apart from the trim balance nut 80. The stack nut 82 includes a finger 140 or other feature that extends towards the first trim balance nut end 96. The finger 140 may be an engagement surface that does not extend towards the first trim balance nut end 96 but instead abuts or engages the first trim balance nut end 96. The finger 140 or engagement surface is arranged to axially retain the balance weight 112 within the aperture 110. Should the finger 140 be positioned such that the finger 140 of the stack nut 82 engage the first trim balance nut end 96 or the second rotatable shaft 70 not be provided, the second arm 122 may not be provided with the retention assembly 94 such that only the first arm 120 and the third arm 124 are provided. In such an arrangement, the axially retaining of the trim balance nut 80 by the second arm 122 may not be necessary.

The finger 140 may be provided with or instead of the retaining ring 116. The finger 140 may be provided as part of a plurality of fingers that are circumferentially spaced apart from each other by a gap 142, as shown in FIG. 5. The plurality of fingers are arranged to axially retain a balance weight within respective apertures of the plurality of apertures 106.

Each finger 140 defines a recess 144 that is arranged to receive a locking assembly 146 that extends between the recess 144 and a slot or a pocket defined by the rotatable shaft. The locking assembly 146 is arranged to inhibit the stack nut 82 from loosening from the rotatable shaft.

The trim balance nut 80 of the trim balance device 60 provides a simple device that may be added to a rotatable shaft of the gas turbine engine 20 while the gas turbine engine 20 is in a substantially assembled state to enable the balance correction of a rotatable component of the gas turbine engine 20 without material removal. The trim balance nut 80 of the trim balance device 60 may provide an adjustable balance capability and may have a position that is variable or adjustable circumferentially or axially relative to the central longitudinal axis A to facilitate balance correction.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A trim balance device for a gas turbine engine having a rotatable shaft extending along a central longitudinal axis of the gas turbine engine, the trim balance device, comprising:
   a trim balance nut at least partially disposed about the rotatable shaft, the trim balance nut defining an aperture that extends from a first trim balance nut end towards a second trim balance nut end along the central longitudinal axis, the aperture being arranged to receive and seat a balance weight; and
   a stack nut disposed about the rotatable shaft, the stack nut being arranged to retain the balance weight within the aperture.

2. The trim balance device of claim 1, wherein the trim balance nut includes an outer surface and an inner surface that each extend between the first trim balance nut end and the second trim balance nut end.

3. The trim balance device of claim 2, wherein the trim balance nut defines a groove that radially extends from the aperture towards the outer surface and the inner surface.

4. The trim balance device of claim 3, further comprising:
   a retaining ring that is received within the groove and is arranged to retain the balance weight within the aperture.

5. A gas turbine engine having a central longitudinal axis, the gas turbine engine comprising:
   a turbine section having a turbine disposed about a rotatable shaft that extends along the central longitudinal axis; and
   a trim balance device disposed about the rotatable shaft, comprising:
      a trim balance nut having an outer surface and an inner surface that engages the rotatable shaft, the outer surface and the inner surface each extend between a first trim balance nut end and a second trim balance nut end along the central longitudinal axis, the trim balance nut defining an aperture that extends from the first trim balance nut end towards the second trim balance nut end along the central longitudinal axis, the aperture being arranged to receive and seat a balance weight; the trim balance nut further including a retention assembly that extends from the second trim balance nut end towards a second rotatable shaft that is connected to the rotatable shaft.

6. The gas turbine engine of claim 5, the retention assembly, comprising:
   a first arm that extends from the second trim balance nut end along the central longitudinal axis.

7. The gas turbine engine of claim 6, the retention assembly, further comprising:
   a second arm that extends from the first arm and extends into a pocket that is defined by the second rotatable shaft to facilitate retaining the trim balance nut to the second rotatable shaft; and
   a third arm that extends from at least one of the first arm and the second arm, the third arm being spaced apart from the second rotatable shaft.

8. The gas turbine engine of claim 7, the third arm defining a recess.

9. The gas turbine engine of claim 8, further comprising:
a locking assembly that extends between the recess and a slot of the second rotatable shaft.

10. A gas turbine engine having a central longitudinal axis, the gas turbine engine comprising:
   a turbine section having a turbine disposed about a rotatable shaft that extends along the central longitudinal axis; and
   a trim balance device disposed about the rotatable shaft, comprising:
      a trim balance nut having an outer surface and an inner surface that engages the rotatable shaft, the outer surface and the inner surface each extend between a first trim balance nut end and a second trim balance nut end along the central longitudinal axis, the trim balance nut defining an aperture that extends from the first trim balance nut end towards the second trim balance nut end along the central longitudinal axis, the aperture being arranged to receive and seat a balance weight; and
      a stack nut disposed about the rotatable shaft.

11. The trim balance device of claim 10, wherein the stack nut is arranged to retain the balance weight within the aperture.

12. A method of balance correction of a rotatable shaft of a gas turbine engine, comprising:
   installing a trim balance nut to the rotatable shaft, the trim balance nut defining a plurality of circumferentially spaced apart apertures that extend from a first trim balance nut end towards a second trim balance nut end along a central longitudinal axis;
   identifying a level of balance correction of at least the rotatable shaft;
   identifying an aperture of the plurality of circumferentially spaced apart apertures associated with the level of balance correction; and
   removing the trim balance nut from the rotatable shaft.

13. The method of claim 12, further comprising:
   inserting a balance weight into the identified aperture.

14. The method of claim 13, further comprising:
   installing the trim balance nut having the balance weight installed into the identified aperture onto the rotatable shaft.

15. The method of claim 14, further comprising:
   retaining the balance weight within the identified aperture with a finger of a stack nut that is disposed about the rotatable shaft and is spaced apart from the trim balance nut.

* * * * *